Jan. 26, 1954     A. FERIER     2,667,568
APPARATUS FOR TREATING GLASS FIBER CLOTH
Filed March 8, 1950
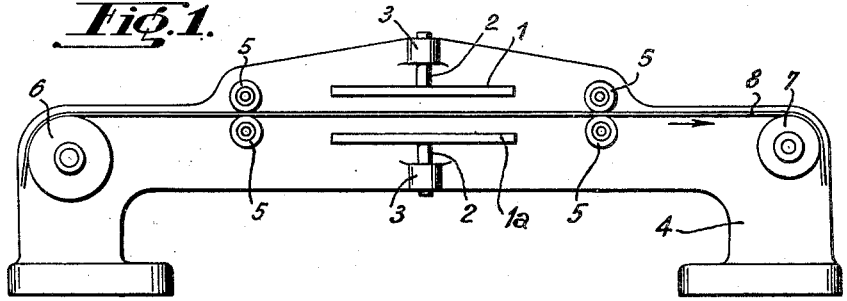
Inventor
ALBERT FERIER Patented Jan. 26, 1954

2,667,568

UNITED STATES PATENT OFFICE 2,667,568

APPARATUS FOR TREATING GLASS FIBER CLOTH

Albert Férier, Geneva, Switzerland

Application March 8, 1950, Serial No. 148,308

Claims priority, application Switzerland June 20, 1949

1 Claim. (Cl. 219—47)

The invention has for object a method for the thermal treatment of glass fiber cloth, and an equipment for carrying out said method.

The purpose of this treatment is to eliminate, or at least to reduce the relatively characteristically rough feel touch of the cloth, due to the very great stiffness of the glass fibres.

Whatever the fineness of the fibres forming a glass fibre cloth, this cloth always retains a characteristic feel which considerably restricts its field of application. This rough feel is due to the very great stiffness of the glass fibres which are, the diameter being the same, three or four times more stiff than ordinary textile fibres.

According to a so-called "coronizing process" for rendering the fibres more fluffy, the disadvantages due to the stiffness of the individual fibres of glass may be attenuated or diminished by a thermal treatment.

The object of this latter treatment, which constitutes the first phase of the said method, is to soften sufficiently these fibres in order that they adopt the definitive shape assigned thereto by the interlacing of their weaving. The said thermal treatment is generally followed by a mechanical and chemical treatment which consists in covering the glass fibres thus rendered more fluffy with a permanent film of a product adapted to soften and protect their surface.

The glass fibre cloths treated according to this method offer greatly improved qualities of flexibility and a much more agreeable feel than before the treatment. Unfortunately, the said method is accompanied by numerous technical difficulties, the principal one being that the glass fibre cloth must be brought to a relatively high temperature, between 450 and 600° C. depending on the composition of the glass forming the fibres. Regardless of the heating devices employed and the nature of the source of heat, it is very difficult to bring glass fibre cloth rapidly to a high temperature so as to obtain a uniform distribution of the heat in the cloth and in the fibres forming the same. It is therefore very difficult for all the fibres to be brought to the same temperature regardless of their position in the cloth. This result may be reached very approximately by very slow heating. Known apparatus employ illuminating gas as the heat source and their operation is extremely delicate.

The object of the present invention is to overcome these difficulties. According to the invention, the glass fibres of the cloth to be treated are heated by dielectric losses, by applying thereto a high frequency alternating electric field of a strength, duration and frequency such that they are brought to their softening temperature and adopt the shape given them by the interlacing of their weaving.

The equipment for carrying out the above method includes a high frequency electric power supply, at least two electrodes connected respectively to the two poles of the said supply and means adapted to feed the cloth to be treated between the said electrodes.

The accompanying drawing shows, by way of example, two embodiments of the equipment for the thermal treatment of a glass fibre cloth in accordance with this invention.

Fig. 1 is a front elevation of a first embodiment.

Fig. 2 is an explanatory diagram.

Fig. 3 is a front elevation of a second embodiment, and

Fig. 4 is a plan view of the same.

The equipment shown in Fig. 1 includes a high frequency electric power supply, not shown. This supply is connected to electrodes 1 and 1a forming a condenser. These metallic electrodes are fixed by means of rods 2, of insulating material, for example quartz, to members 3 projecting from a frame 4. The rods 2 may slide in the members 3 which are bored to receive them and which carry means, not shown, to lock the said rods in position.

The respective positions of the electrodes 1 and 1a relative to the frame 4 and to one another may thus be controlled. The frame 4 further carries two pairs of guiding rolls 5, the axes of which are perpendicular to the said frame and parallel to the plane of the electrodes 1 and 1a. The same frame also carries a single guiding roll 6 and a driving roll 7. The driving roll 7 is itself driven by any kind of means, for example by an electric motor and through the intermediary of a speed-reducing transmission. According to the nature of the cloth treated, that is to say according to its mechanical resistance and to its thickness, at least one of the rolls of at least one of the pairs of rolls 5 may also be driven and, whenever necessary, a pressure roll may be arranged in such a way as to press the cloth 8 against the driving roll 7, as also in the case of the second embodiment, described further on with reference to Figs. 3 and 4.

The equipment described is adapted for the treatment of a band 8 of glass fibre cloth, that is to say glass fibre cloth of relatively small width. The said equipment is relatively simple due to the fact that the electrodes and the rolls included therein are all mounted so as to overhang from the frame 4 having a single mounting face. The band 2 of glass fibre cloth may therefore easily be inserted between the electrodes 1 and 1ª and between the rolls 5 of each pair of rolls, and arranged on the roll 6 and on the driving roll 7.

This example has been chosen in order to simplify the description and the understanding of the same and it is obvious that similar equipments may be constructed which are capable of treating glass fibre cloths having great widths. In such a case, the said equipments are more complicated and generally include a greater number of guiding rolls, pressure rolls and driving rolls, or, further, known means adapted to feed the cloth to be treated between the electrodes. The rolls employed in the said equipments are of considerable length, at least equal to the width of the cloth to be treated, so that it is often not possible to mount them so that they overhang from a single face of a frame. Similarly, the electrodes 1 and 1ª then have a great width, and the power which the high frequency electric power supply is capable of providing must be proportionate to the quantity of cloth to be treated in unit time, that is to say practically to the width of the cloth.

The electrodes 1 and 1ª are connected to the terminals of the high frequency electric power supply and power is applied to the said electrodes to produce between them a high frequency alternating electric field of desired strength and frequency in order that the glass fibres of the cloth to be treated, fed between the said electrodes, be heated by dielectric losses and brought to their softening temperature during their passage between the electrodes 1 and 1ª. The duration of the passage of the cloth between the electrodes 1 and 1ª may be controlled by varying the feeding rate of the cloth, or else by varying the length of the electrodes. In the latter case, the power supplied to the electrodes must also be varied so that the electric field produced is of the same strength. The glass fibres thus treated assume the shape assigned thereto by the interlacing of their weaving.

In another embodiment, not shown, one of the electrodes is constituted by at least one member forming part of the feeding means. This member may be a supporting roll or even an endless belt, the said roll or the said belt being driven and serving to feed the fibre glass cloth.

The fibre glass cloth thus treated is very rapidly brought to the desired temperature, allowing for a considerable treatment rate. The distribution of the temperature is homogeneous throughout the whole mass of the glass fibre cloth, due to the fact that it is in the glass itself that at least a part of the heat is developed by dielectric losses.

In an equipment such as the one described, it is easy to maintain constant the treatment temperature, either by controlling, in an instantaneous manner, the high frequency power furnished by the supply, or by controlling the time during which the treated cloth is maintained in the electric field between the electrodes.

According to known arrangements, it is possible to measure the temperature reached by the glass fibres in the electric field and to control the power supplied to the said fibres by the field, in terms of the said temperature. The said control may be carried out by operating on the time during which the glass fibres are placed in the electric field or else by acting on the strength of the field, that is to say on the power supplied by the high frequency electric power supply. In the equipment described, the thermal treatment is carried out in a continuous manner and the band of glass fibre cloth may be fed between the electrodes at a determined constant rate, the strength of the field between the said electrodes being then controlled in terms of the temperature reached by the said fibres in the said field. One could also maintain constant the strength of the electric field and control the rate at which the glass fibre cloth is fed between the electrodes.

The electrodes included in the equipment described constitute the armatures of a condenser the dielectric of which is in part formed by the glass fibre cloth treated. The frequency of the electric voltage supplied to the terminals of the said condenser is preferably relatively high, for example 5 to 100 megacycles.

Known means adapted to be employed to measure the temperature of the glass fibres in the electric field may comprise at least one thermally sensitive element and this element may be constituted by a photo electric cell or by a resistance element having a high thermal coefficient, of the type called a "thermistor."

The power dispersed in the dielectric, that is to say in the glass fibre cloth is given by the equation:

$$P = 5.58 \times 10^{-13} \times f \left(\frac{E}{d}\right)^2 \frac{K \cos \phi}{Q}$$

In this equation:
P is the power in watts per gram of glass,
E is the effective value of the sinusoidal voltage applied to the electrodes,
$f$ is the frequency of this voltage,
$d$ is the distance separating the two electrodes,
K is the dielectric constant of the glass employed,
$\cos \phi$ is the power factor of the glass,
Q is the density of the same.

It is possible to calculate the power necessary to raise the temperature of the glass by $\Delta T°$ : S being the specific heat of the glass employed and M the mass of glass to be treated per unit of time, a quantity of heat equal to $W = S \times M \times \Delta T°$ must be supplied to the said mass of glass, that is to say in watts-minutes:

$$W = \frac{4.18}{60} \times S \times M \times \Delta T°$$

It must be borne in mind that the power factor of the glass employed varies with the frequency $f$ of the electric field and with the temperature to which this glass is brought. The laws governing these variations are not exactly known for all qualities of glass, so much so that it is difficult to provide for the optimum frequency to be employed in each case. One must also bear in mind the frequency limitations of the normal emitting tubes adapted to equip the high frequency power supply: the characteristics of these tubes will generally set an upper limit for the frequency liable to be employed.

It is obvious that the method described offers great advantages as regards the quality of the glass fibre cloth which may be produced as a result of such a treatment. In fact, this quality depends very strictly on the constancy of the temperature and the regularity of its distribution in the glass fibres forming the cloth. The said method also offers great advantages from the industrial point of view: it allows in fact of treating a very considerable quantity of cloth in a reduced lapse of time.

As stated above, the coefficient of dielectric losses of the glass is a function of its temperature and it is generally very low at a low temperature.

In most of the standard glasses, this coefficient tg δ increases with the temperature T, first slowly, as shown on the left of the curve in Fig. 2, and then sharply, at a relatively high temperature but already well before the softening temperature of the glass in question. Thus, it is preferable to heat beforehand the glass fibres before subjecting them to the high frequency electric field adapted to bring them to their softening temperature, or else to increase in any other way their coefficient of dielectric losses or the coefficient of dielectric losses of the cloth.

It is thus possible to reduce within considerable proportions the electric power necessary to bring the glass fibre cloth to the softening temperature of the said glass.

Different embodiments of the method may be brought into operation in order to attain this end.

According to one of these embodiments, the glass fibres are heated beforehand in order to increase their coefficient of dielectric losses. This preliminary heating may, for example, be produced by means of a known electric resistance heating device or of a known gas heating device. This device may constitute a continuous preliminary heating oven when the continuous treatment of the cloth is carried out. The said cloth may then, for example, be fed through the equipment in the form of a band.

The preliminary heating device may also be constituted by at least one endless movable member heated by dielectric losses in the same high frequency alternating field as that in which the glass fibres must be brought to their softening temperature and in proximity to which the glass fibres are passed before subjecting them to the said electric field. This endless movable member may be constituted at least in part by a material offering a coefficient of dielectric losses higher in the cold state than that of the glass constituting the glass fibres, also in the cold state. Preferably, the said endless member is moved in the electric field in the same direction as that in which the glass fibre cloth is fed in the said field, so that the said cloth passes near to a warm part of the said member before penetrating into the said field.

The equipment for carrying out the said embodiment of the method may include a device for the preheating of the glass fibres, this device constituting a continuous preheating oven when the equipment is designed to carry out the continuous treatment of the glass fibre cloth. The said device may be an electrical device including at least one resistance arranged to be heated by electric current. It may also be provided to employ a combustible gas as a supply of heat and then includes at least one burner fed with combustible gas. When the preliminary heating is obtained by passing the glass fibre cloth near to an endless movable band heated by dielectric losses, the preliminary heating device then comprised in the equipment includes at least one endless movable member arranged to be heated by dielectric losses in the said high frequency alternating electric field.

This member may at least in part be made of a material having a coefficient of dielectric losses higher, in the cold state, than that of the glass constituting the glass fibres included in the cloth treated, also in the cold states.

When it is desired to carry out the continuous treatment of glass fibre cloth, the said endless movable member may be arranged so as to move in the said electric field, in the same direction as the glass fibre cloth, so that this cloth passes near a warm part of the said member before penetrating into the field. If desired, one may control the length of travel along which the glass fibre cloth passes near the endless movable member, before penetrating in the high frequency alternating electric field, so that the said cloth offers a determined coefficient of dielectric losses when it penetrates into the said field. A preferred embodiment of such an equipment is shown in Figs. 3 and 4. This equipment includes two endless movable members 9 and 9ᵃ each arranged around rolls 10, 11, 12 and 13. These rolls are mounted so as to overhang from a mounting face of a frame 4. The pivots of the rolls 10 and 11 are stationary relative to the frame 4, the rolls 10 being mounted on driven shafts. Each of the rolls 12 is mounted on a sliding rod 14, carrying a supporting fork 15, between the arms of which the roll 12 is mounted on a pivot 16. The rod 14 is mounted to slide in a vertical hole of a member 17 projecting from the frame 4; a spring 18 is arranged between the member 17 and the fork 15, so as to stretch the endless movable member 9, or 9ᵃ, by drawing the associated roll 12 away from the plane in which the glass fibre cloth is fed. Each of the rolls 13 is mounted on a pivot or axle 19 the position of which in a longitudinal slot 20, made in the frame 4, may be controlled, the said pivot being stationary and locked in position in the frame 4. The pivot 19 is threaded at its two ends and it is gripped in the slot 20 of the frame 4 by means of nuts 22. It carries a sleeve, not shown, on which the roll 13 is mounted to rotate, and the nut 22 mounted away from the frame 4 locks this sleeve in position against the said frame, a washer 21 being inserted between this nut and the sleeve.

Electrodes 1 and 1ᵃ, carried by rods 2, of insulating material, are secured in members 3 projecting from the frame 4, in a similar manner to that described relative to the first embodiment. The frame 4 also carries two pairs of rolls constituting feeding means for the glass fibre cloth. One of these rolls 7 is driven to rotate and to feed the glass fibre cloth, at the same time as the rolls 10 driving the endless movable members 9 and 9ᵃ, by means of driving means not shown. A roll 23 is arranged to press the glass fibre cloth 8 against the roll 7. At the other end of the equipment, a pair of guiding rolls 6 and 24 are mounted on the frame 4.

By moving the pivots 19 carrying the rolls 13, it is possible to control the length of travel along which the cloth 8 passes near to the members 9 and 9ᵃ before penetrating into the high frequency alternating field. The members 9 and 9ᵃ are subjected to this field at the same time as the cloth, between the electrodes 1 and 1ᵃ.

According to the same principle, an equipment may also be constructed for the simultaneous continual treatment of several bands of cloth, the said equipment including several endless movable members arranged so as to be separated one from the other by the different bands of cloth. Thus, in an equipment provided for the treatment of $n$ bands of cloth, there would be $n+1$ endless movable members.

The dielectric adapted to be subjected to the action of the high frequency alternating electric field is thus constituted by alternate layers of the material of which are made the endless movable members and the glass fibre cloth.

Such an equipment is thus conceived for the sandwich treatment of several layers of cloth.

An equipment of this kind could for example be constructed in a manner similar to that shown in Figs. 3 and 4. It would include $n+1$ endless movable driven to move in a same plane, and means for feeding $n$ bands of glass fibre cloth between these members and between electrodes, such as the electrodes 1 and 1ª. These means would include, for example, countershaft rolls mounted askew to feed the band of cloth into the plane of the endless movable members and between these, according to directions at an angle with the said plane, and similar means for withdrawing the treated bands out of the plane of the endless movable members.

According to another embodiment of the method, the coefficient of dielectric losses of the cloth is preliminarily increased by oiling, that is to say by dressing the cloth or impregnating it with a substance adapted to increase its coefficient of dielectric losses. This oiling may be carried out by means of a volatile product, for example an oil or a synthetic resin which evaporates in the course of the treatment of the cloth in the high frequency electric field, when the glass fibres are brought near to their softening temperature. In this case, this oiling is a nonpermanent oiling of the cloth. A permanent oiling of the cloth may also be carried out by means of a non-volatile product, for example a silicone or a fluorous resin.

Preferably, this nonvolatile product is chosen in such a way that it is capable to resist a temperature of at least 600° C.

The equipment for carrying out this embodiment of the method includes a device adapted for the oiling of glass fibre cloth. The said device may be adapted for the nonpermanent oiling of the cloth by means of a volatile product or for the permanent oiling of the cloth by means of a nonvolatile product. It may, for example, include an oiling tank adapted to receive the material by means of which the cloth is to be dressed or impregnated, and means for feeding the cloth into the said tank, so as to make it penetrate into the oiling material and then to make it come out again from this bath and this tank. This same device may also include means for maintaining the oiling bath at a determined temperature and for maintaining the desired level of the oiling material in the tank. In case the oiling material is a volatile product, the device preferably includes means for preventing this material from evaporating in too great quantities into the outer air, for example a cover adapted to allow the cloth to penetrate into the bath and to allow it to come out of the same. The remainder of the equipment may, for example, include an equipment such as the one described with reference to Fig. 1.

Due to the preliminary increase in the coefficient of dielectric losses of the cloth produced by a preliminary heating or by oiling, the treatment of glass fibre cloth may be considerably accelerated or, alternately, one may employ a weaker electric field and, consequently, lower high frequency voltages. If desired, it is also possible to accelerate, to a certain degree, the treatment of glass fibre cloth while employing a reduced electric field. The efficiency of the equipment is in any case greatly improved due to the fact that the dielectric losses in the glass constituting the glass fibres are thus made to form a considerable portion of the total losses which are produced in the high frequency alternating electric field.

I claim:

Apparatus for the treatment of glass fibre cloth, comprising a source of high frequency electrical power, electrodes connected to said source, at least one endless movable member arranged to pass through a high frequency electrical field set up between said electrodes, said member comprising material having, in the cold state, a greater coefficient of dielectric loss than the glass of which said cloth is made, feeding means for passing said cloth in the vicinity of a preheated portion of said endless movable member prior to the passage of said cloth through a high frequency electrical field set up between said electrodes, and variable means for extending said movable member to a predetermined extent in advance of said high frequency electrical field for controlling the length of the path through which said cloth travels and is preheated therein, prior to its passage through said electrical field.

ALBERT FÉRIER.

References Cited in the file of this patent

UNITED STATES PATENTS

| Number | Name | Date |
| --- | --- | --- |
| 1,636,511 | Hering | July 19, 1927 |
| 2,263,217 | Lillie et al. | Nov. 18, 1941 |
| 2,364,790 | Hemming | Dec. 12, 1944 |
| 2,384,541 | Fruth | Sept. 11, 1945 |
| 2,385,567 | Descarsin | Sept. 25, 1945 |
| 2,390,572 | Brabander | Dec. 11, 1945 |
| 2,393,530 | Harris | Jan. 22, 1946 |
| 2,412,982 | Hart | Dec. 24, 1946 |
| 2,413,003 | Sherman | Dec. 24, 1946 |
| 2,423,902 | Peterson | July 15, 1947 |
| 2,460,566 | Brown et al. | Feb. 1, 1949 |

FOREIGN PATENTS

| Number | Country | Date |
| --- | --- | --- |
| 592,960 | Great Britain | Oct. 3, 1947 |
| 599,935 | Great Britain | Mar. 24, 1948 |
| 610,520 | Great Britain | Oct. 18, 1948 |
| 617,968 | Great Britain | Feb. 15, 1949 |

OTHER REFERENCES

"Glass, the Miracle Maker," Phillips, pub. by Pitman Publishing Co., N. Y., 1948, page 227. Copy in Scientific Library.